(12) United States Patent
Chen et al.

(10) Patent No.: US 8,787,270 B2
(45) Date of Patent: Jul. 22, 2014

(54) DATA TRANSMISSION AND ASSOCIATION METHOD IN A NON-TRANSPARENT CENTRALIZED SCHEDULING MULTI-HOP RELAY NETWORK

(75) Inventors: Yuqin Chen, Shenzhen (CN); Hongyun Qu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1003 days.

(21) Appl. No.: 12/745,174

(22) PCT Filed: Jul. 16, 2008

(86) PCT No.: PCT/CN2008/071664
§ 371 (c)(1),
(2), (4) Date: May 27, 2010

(87) PCT Pub. No.: WO2009/086750
PCT Pub. Date: Jul. 16, 2009

(65) Prior Publication Data
US 2010/0309858 A1   Dec. 9, 2010

(30) Foreign Application Priority Data

Jan. 11, 2008  (CN) .......................... 2008 1 0003914
Apr. 18, 2008  (CN) .......................... 2008 1 0092678

(51) Int. Cl.
*H04W 72/04*   (2009.01)

(52) U.S. Cl.
USPC ........................................................ 370/329

(58) Field of Classification Search
USPC ................. 370/315, 338, 390, 328–329, 389, 370/431–432, 474, 480, 505; 455/428
See application file for complete search history.

(56) References Cited

U.S. PATENT DOCUMENTS

| 7,664,087 B2 * | 2/2010 | Cho et al. ........................ 370/338 |
| 7,933,236 B2 * | 4/2011 | Wang et al. .................... 370/328 |
| 2006/0239264 A1 * | 10/2006 | Kang et al. .................... 370/390 |
| 2007/0058577 A1 | 3/2007 | Rubin |
| 2007/0072604 A1 * | 3/2007 | Wang ............................ 455/428 |

(Continued)

FOREIGN PATENT DOCUMENTS

| CN | 1992922 | 7/2007 |
| CN | 101064901 | 10/2007 |

(Continued)

OTHER PUBLICATIONS

Izumikawa et al. "MAP Multiplexing in IEEE 802.16 Mobile Multi-Hop Relay", 2006, KDDI R & D Laboratories, Inc., pp. 5.*

(Continued)

*Primary Examiner* — Kwang B Yao
*Assistant Examiner* — Syed M Bokhari
(74) *Attorney, Agent, or Firm* — Oppedahl Patent Law Firm LLC (57) ABSTRACT

A data transmission and association method in a non-transparent centralized scheduling multi-hop relay network includes: when a base station sends data, an Allocation Reference Information Element (IE) will be filled in a mapping message (MAP), for indicating a position of a media access control protocol data unit (MAC PDU) to be transmitted; after a lower relay station receiving the mapping message (MAP) sent by the base station or transmitted by other relay station, the MAC PDU which is obtained according to the indication of the Allocation Reference IE is recombined, and then is put in the bandwidth allocated by the base station and sent downwardly.

19 Claims, 3 Drawing Sheets

(56) References Cited

U.S. PATENT DOCUMENTS

| | | | |
|---|---|---|---|
| 2007/0104223 A1 | 5/2007 | Lee et al. | |
| 2008/0259840 A1* | 10/2008 | Yin et al. | 370/315 |
| 2008/0259857 A1* | 10/2008 | Zheng | 370/329 |
| 2009/0016290 A1 | 1/2009 | Chion et al. | |
| 2009/0092076 A1* | 4/2009 | Zheng et al. | 370/328 |
| 2009/0141676 A1* | 6/2009 | Maheshwari et al. | 370/329 |
| 2009/0201874 A1* | 8/2009 | Okuda | 370/329 |
| 2013/0107797 A1 | 5/2013 | Chion et al. | |

FOREIGN PATENT DOCUMENTS

| | | |
|---|---|---|
| JP | 2006074325 A | 3/2006 |
| JP | 2007312244 A | 11/2007 |
| JP | 2010516190 A | 5/2010 |
| JP | 2010532973 A | 10/2010 |
| WO | 2006115367 A1 | 11/2006 |
| WO | WO2007/019672 | 2/2007 |
| WO | 2007036166 A1 | 4/2007 |
| WO | 2009009511 A2 | 1/2009 |
| WO | WO2009/086750 | 7/2009 |

OTHER PUBLICATIONS

Izumikawa et al. "MAP Multiplexing in IEEE 802.16 Mobile Multi-Hop Relay", 2006, KDDI R&D Laboratories, Inc, pp. 5.*

International Preliminary Report on Patentability for Intl. Pat. Appln. No. PCT/CN2008/071664, dated Jul. 13, 2010.

International Search Report for Intl. Pat. Appln. No. PCT/CN2008/071664, mailed Oct. 16, 2008.

English Translation of Written Opinion of the Intl. Searching Authority for Intl. Pat. Appln. No. PCT/CN2008/071664, mailed Oct. 16, 2008.

Supplementary European Search Report in European application No. 08773201.2, EP counterpart to PCT/CN2008/071664, mailed on Jan. 31, 2014.

IEE 802.16, Air Interface for Fixed and Mobile Broadband Wireless Access Systems, Multihop Relay Specification, Dec. 24, 2007, see Supplementary European Search Report.

Relay Task Group of IEEE 802.16, Multihop Relay Specification, IEEE Standards Draft 802.16J, Oct. 20, 2008, XP-002544453, see Supplementary European Search Report.

Nortel, MAC PDU Design for Supporting Data Forwarding Schemes in 802.16j, Jan. 8, 2007, see Supplementary European Search Report.

* cited by examiner

DATA TRANSMISSION AND ASSOCIATION METHOD IN A NON-TRANSPARENT CENTRALIZED SCHEDULING MULTI-HOP RELAY NETWORK

CROSS-REFERENCE TO RELATED APPLICATIONS

This application is a national stage application of International Application Serial No. PCT/CN2008/071664, filed on Jul. 16, 2008, which claims the benefit of priority to Chinese Application No. 200810003914.8, filed on Jan. 11, 2008 and to Chinese Application No. 200810092678.1, filed Apr. 18, 2008, the contents of which are hereby incorporated by referenced in their entireties.

TECHNICAL FIELD

The present invention relates to the field of communications and, more particularly, to a method for transmitting data and associating a mapping message (MAP) with corresponding data in a non-transparent centralized scheduling multi-hop relay network.

BACKGROUND

Figure 1:
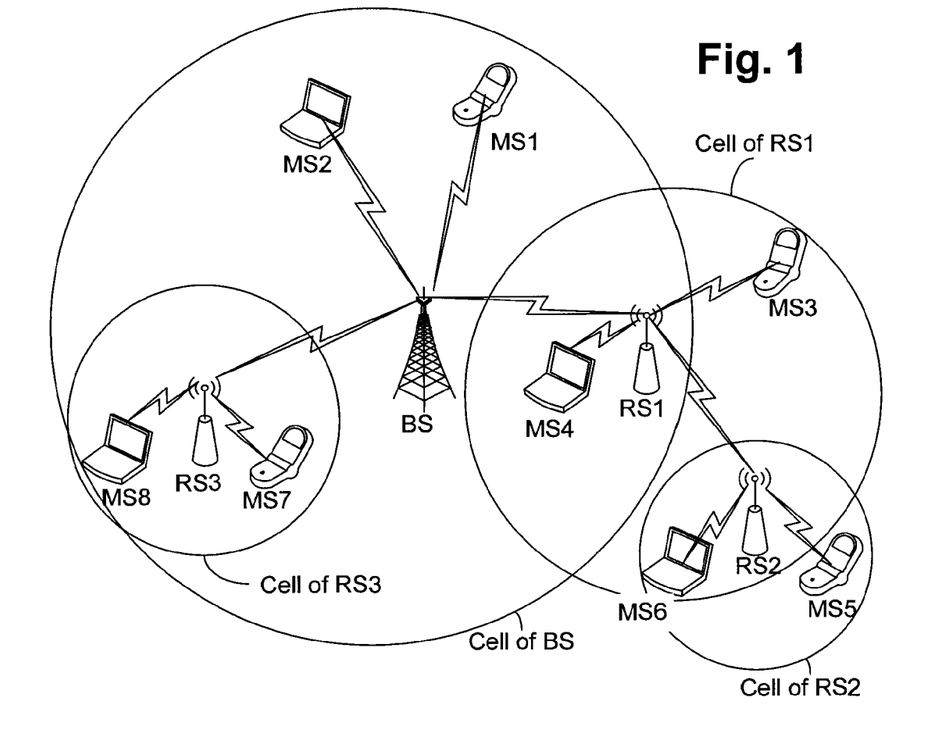
FIG. 1 is a schematic diagram of a wireless multi-hop relay network.

As shown in FIG. 1, in a multi-hop relay system put forth by the IEEE 802.16j Standard Task Group, one or a plurality of relay stations (RS) are disposed between a multi-hop relay base station (MR-BS) and a mobile station (MS), and the extension of coverage and the increase of system capacity are thus realized through relay transmission of BS and terminal signals by the RS. In order to meet the requirements of different application scenarios, the RS may be set as a fixed RS or a mobile RS. Based on the situation whether prefixes and control messages are generated and transmitted, the RS may be classified into a transparent RS and a non-transparent RS. The MR-RS is called a RS for short hereinafter.

In a multi-hop relay network, a transmission link from a terminal to a BS via a RS comprises an access link and a relay link. Wherein, the access link is a communication link starting from or ending at the terminal and may be a link between the terminal and the BS directly connected to the terminal, or a link between the terminal and the RS connected to the terminal. The relay link is a link between the BS and the RS connected to the BS or a communication link between two RSs.

In centralized scheduling, the BS allocates resources to the access link and the relay link in a multi-hop relay cell in a unified way and generates a corresponding MAP (mapping message), or the RS generates its own MAP based on indication information of the BS. In distributed scheduling, the BS and the RS respectively determine resource allocation to sub-relay stations or terminals and generate a corresponding MAP. The relay network hereinafter refers to a non-transparent centralized scheduling multi-hop relay network.

Under the non-transparent circumstance prescribed in the IEEE 802.16j_D2 document, the frame structure of the BS and that of the RS respectively comprise an uplink subframe and a downlink subframe. Each uplink subframe and each downlink subframe respectively comprise an access zone and a relay zone. Wherein, the access zone is for access link transmission, and the relay zone is for relay link transmission. A relay MAP refers to a MAP message sent by the BS or the RS in the relay zone.

The IEEE 802.16j_D2 document specifies two path management modes: explicit path management and embedded path management. In the explicit path management, a path of a BS and an access RS is established and all CIDs (Connection ID) (including an RS management CID, a tunnel CID, a management tunnel CID, a terminal management CID and a terminal transport CID) on the path are associated with a path ID. A path ID/CID association list is generated by the BS and published to all RSs on the path. During data forwarding, the RS first obtains a CID from a MAP IE (MAP Information Element) header or an MAC PDU (Media Access Control Protocol Data Unit) header, and then gets a target station on a next hop through looking up in the path ID/CID association list. In the embedded path management, management CIDs of the RS are allocated by the BS according to a network topological structure system, and the CIDs conceal path information. During data transmission, the RS does not need to look up in the path ID/CID association list.

The IEEE 802.16j_D2 document defines four data transmission modes: a tunnel burst mode, a tunnel packet mode, a CID-based mode and a burst-based mode. Wherein the first two are tunnel transmission modes, and the last two are non-tunnel transmission modes. In the CID-based data transmission mode, an intermediate station reads the CID (the RS management CID, or the terminal management CID or the terminal transport CID) in the MAC PDU header, then looks up in the path ID/CID association list to obtain the information of the target station on the next hop, and performs data forwarding. There is no need to contain CID fields in the MAP IE. This transmission mode has small overhead of the MAP IE and broad application. In the published IEEE 802.16j_D2 document, the CID-based transmission mode is limited to being applicable to all application scenarios: a two-hop transparent mode, a two-hop non-transparent mode, and centralized scheduling and distributed scheduling in a multi-hop non-transparent mode; the tunnel packet mode is limited to being applicable to two-hop and multi-hop non-transparent modes; while due to its own technical defect, the tunnel burst mode is limited to being applicable to the distributed scheduling in the multi-hop non-transparent mode only.

In the CID-based data transmission mode, the RS gets path information through looking up in the path ID/CID association list and then forwards data by using the CID in the MAC PDU header. In the MAP IE, it may not contain CID information.

In the tunnel packet transmission mode, firstly the BS establishes a tunnel from the BS to an access RS and distributes a tunnel CID and a management tunnel CID for the tunnel. During downlink data transmission, the BS cascades the MAC PDUs sent to the terminals connected to a same access RS and encapsulates them with one relay MAC PDU header. The CID in the header is a tunnel CID or a management tunnel CID. During uplink data transmission, data encapsulation is performed by an access RS.

The tunnel packets on different tunnels may be packed into a same burst when they pass a same RS. The RS forwards data through the CID in the relay MAC PDU header, and the MAP IE may not contain CID information.

In the downlink tunnel burst transmission mode, the BS cascades the MAC PDUs sent to the terminals connected to a same access RS and put them into a burst. During uplink data transmission, data are processed by an access RS. The RS forwards data by using the CID in the MAP IE. The tunnel bursts on different tunnels shall not be packed into a same burst when they pass a same RS.

In the CID-based data transmission mode, as the CID field in the MAP IE is optional, the RS is unable to map the received data to the corresponding bandwidth. Moreover, when the delay between data reception and data forwarding of the RS is variable and unfixed, if the MAC PDU in a frame is lost, the RS will send the MAC PDU in a subsequent frame in advance. This circumstance will affect the performance of QoS (Quality of Service), jitter for example. Besides, if the condition of the down link of the RS is suddenly worsened, the BS will be unable to dynamically control the data transmission condition of the entire link.

SUMMARY

The technical problem the present invention aims to solve is to provide a data transmission and association method in a non-transparent centralized scheduling multi-hop relay network, avoiding the failure of data mapping and improving the QoS performance.

To solve the above technical problem, the present invention provides a data transmission and association method in a non-transparent centralized scheduling multi-hop relay network, including:

when a BS sends data, an Allocation Reference IE will be filled in a MAP, for indicating a position of an MAC PDU to be sent; and after receiving the MAP sent by the BS or forwarded by other RS, a lower RS will obtain the MAC PDU according to an indication of the Allocation Reference IE in the MAP, recombine the obtained MAC PDU, then put it into a bandwidth allocated by the BS and send it downwardly.

Further, the Allocation Reference IE may include a DL Allocation Reference IE; the Allocation Reference IE may be before or behind a DL-MAP IE of an RS_Access MAP; after the RS receives the DL Allocation Reference IE, the MAC PDUs indicated by the DL Allocation Reference IE will be recombined, then be put into a downlink bandwidth indicated by the DL-MAP IE and be sent to a terminal; or, the Allocation Reference IE may be before or behind an R-DL-MAP IE of an RS_RLY MAP; after the RS receives the DL Allocation Reference IE, the MAC PDUs indicated by the DL Allocation Reference IE will be recombined, then be put into a downlink bandwidth indicated by the R-DL-MAP IE and be sent to a lower RS.

Further, when the Allocation Reference IE is contained in the RS_Access MAP, the DL Allocation Reference IE may be before or behind the DL MAP IE of all or some of the following messages: an RS DL MAP, a Compressed Downlink MAP (Compressed DL MAP) and an SUB-DL-UL-MAP.

Further, the DL Allocation Reference IE may contain Num_Connections and a CID. Wherein, the Num-Connections is for indicating the number of connections from which the MAC PDUs to be sent come; the CID is for indicating a connection identifier of a connection from which the MAC PDU to be sent comes.

Further, the DL Allocation Reference IE may also contain Num_Received Frames and Received Frame Index. Wherein, the Num_Received Frames is for indicating the number of data frames from which the MAC PDUs transmitted in the corresponding bandwidth and on the corresponding connections come; the Received Frame Index is for indicating a frame number of a data frame from which the MAC PDU transmitted in the corresponding bandwidth and on the corresponding connection comes.

Further, the DL Allocation Reference IE may also contain Num_MAC PDUs, the Num_MAC PDUs is for indicating the number of the MAC PDUs which are transmitted in the corresponding bandwidth, are on the corresponding connections and come from the corresponding frames.

Further, before the RS starts downlink transmission, the DL Allocation Reference IE sent to the RS may be removed first.

Further, the method may be applicable to a CID-based data transmission mode.

Further, after the RS receives the DL Allocation Reference IE, if the MAC PDU to which the DL Allocation Reference IE corresponds fails to be found, no downlink data transmission will be performed.

Further, the recombination may refer to one of the following operations: the RS puts the MAC PDUs into a burst indicated by the IE; a burst is formed after the RS demodulates and decodes the MAC PDUs and then recodes and remodulates them; or a burst is formed after the RS segments and/or packs the MAC PDUs.

To solve the above technical problems, the present invention also provides a method for associating a MAP with corresponding data in a multi-hop relay network, including:

an Allocation Reference IE is added in the MAP, for indicating a position of an MAC PDU to be sent;

after receiving the MAP sent by a BS or forwarded by other RS, an RS will obtain the MAC PDU indicated by the Allocation Reference IE, recombine the MAC PDU and put it into a bandwidth allocated by the BS to send.

The method described in the present invention is applicable to a CID-based transmission mode. By adopting the method described in the present invention, in the CID-based data transmission mode, an RS may associate a bandwidth allocated to it with corresponding data to be sent. The fields of Num_Received Frames and Received Frame Index in a DL Allocation Reference IE make the delay between data reception and data forwarding of the RS variable and unfixed, therefore avoiding the impact on the QoS performance resulting from the problem that the loss of an MAC PDU in a frame triggers the RS to send the MAC PDU in a subsequent frame in advance.

Besides, by using the present invention, if the condition of the down link of the RS is suddenly worsened, the BS may control the downlink data traffic of the RS through instructing the RS to cache some of the data, thus dynamically controlling the data transmission condition of the entire link.

DETAILED DESCRIPTION

The present invention will be further described in details by referring to drawings and embodiments.

FIG. 1 is a schematic diagram of a non-transparent centralized scheduling wireless multi-hop relay network to which the present invention is applicable. In this multi-hop relay network, signal transmission between a BS and a terminal is completed via one-hop or multi-hop relay. As shown in FIG. 1, on the transmission path between the BS and MS7, there is one relay station: RS3, and on the transmission path between the BS and MS5, there are two relay stations: RS1 and RS2.

Embodiment 1

This embodiment puts forth two new MAP IEs: a DL Allocation Reference IE (downlink allocation reference information element) and a UL Allocation Reference IE (uplink allocation reference information element). The DL Allocation Reference IE is for indicating data downwardly sent by an RS. In a bandwidth indicated by a DL-MAP IE or an R-DL-MAP IE, these data are sent to a terminal or a lower RS. Based on an indication of the DL Allocation Reference IE, when the RS sends the data downwardly, it may flexibly pack and send MAC PDUs in different frames or a same frame. The UL Allocation Reference IE is for indicating data upwardly sent by an RS. In a bandwidth indicated by an R-UL-MAP IE, these data are sent to a BS or an upper RS. Based on an indication of the UL Allocation Reference IE, when the RS sends the data upwardly, it may flexibly pack and send MAC PDUs in different frames or a same frame, which are submitted by each terminal or lower RS. This plays a particularly important role in saving the overhead of the system. Below is the detailed description:

The DL Allocation Reference IE is used to associate the MAC PDU received by the RS with a downlink transmission bandwidth allocated to it. The MAC PDU is sent to the RS by the BS or the upper RS; the RS uses the downlink transmission bandwidth to send the MAC PDU to the terminal or the lower RS. The DL Allocation Reference IE is inserted into an RS_Access MAP and an RS_RLY MAP. If the above two messages both exist, they both may include the DL Allocation Reference IE. The DL Allocation Reference IE, the positions of which in the RS_Access MAP and the RS_RLY_MAP are shown in Table 1 and Table 2, is next to the corresponding DL-MAP IE or R-DL-MAP IE, i.e. before or behind the DL-MAP IE or the R-DL-MAP IE. Concretely, in the RS_Access MAP message, the DL Allocation Reference IE is next to the DL MAP IE in all or some of the following messages: an RS DL MAP, a Compressed DL MAP, an SUB-DL-UL-MAP and an HARQ MAP; in the RS_RLY MAP message, the DL Allocation Reference IE is next to the R-DL MAP IE.

The UL Allocation Reference IE is used to associate the MAC PDU received by the RS with uplink transmission resources allocated to it. The MAC PDU is sent to the RS by the terminal or the lower RS; the RS uses an uplink bandwidth to send the MAC PDU to the BS or the upper RS. The UL Allocation Reference IE exists in the RS_RLY_MAP message only, which is next to the R-UL-MAP IE, i.e. before or behind the R-UL-MAP IE, and the position of which in the RS_RLY_MAP message is shown in Table 2.

TABLE 1

Position of DL Allocation Reference IE contained in RS_Access_MAP

| Grammar | Length | Note |
| --- | --- | --- |
| RS_Access-MAP_Message_Format{ ... | — | — |
| If(bit #2 of indicator ==1){ | — | Information of RS DL-MAP or Compressed DL MAP |
| DCD Count | 8 bits | DCD Count in RS DL-MAP or Compressed DL MAP |
| Nr of OFDMA Symbols | 8 bits | The number of OFDMA Symbols in RS DL-MAP or Compressed DL MAP |
| DL IE Count | | The number of DL-MAP LEs |
| For(i=0; i<DL IE Count; i++){ | — | — |
| DL MAP IE( ) | Variable | The number of "DL MAP IEs" in RS DL-MAP or Compressed DL MAP |
| DL Allocation Reference IE( ) | Variable | Correspond to the DL MAP IE( ) and indicate the data allocated to the bandwidth |
| } } | | |
| If(bit #4 of indicator ==1){ | — | Information of SUB-DL-UL-MAP |
| Nr of SUB-MAP | 2 bits | The number of SUB-DL-UL-MAPs |
| For(i=0;i<Nr of SUB-MAP;i++){ Reduced SUB-DL-UL-MAP( ){ ... | — | — |
| For(i=1;i<=DL IE Count;i++){ | | |
| DL-MAP_IE( ) | Variable | — |
| DL Allocation Reference IE( ) | Variable | Correspond to the DL MAP IE( ) and indicate the data allocated to the bandwidth |
| } } } } } | | |
| If(bit #5 of Indicator ==1){ | | |
| Nr of HARQ-MAP | 2 bits | The number of HARQ-MAPs |
| For(i=0;i<Nr. Of HARQ-MAP; i++){ Reduced HARQ-MAP( ){ ... | — | — |
| DL IE Count | 6 bits | The number of DL IEs |
| For (i=0; i<DL IE count; i++){ | — | — |
| Compact DL-MAP IE( ) | Variable | — |
| DL Allocation Reference IE( ) | Variable | — |
| } } | | |

TABLE 1-continued

Position of DL Allocation Reference IE contained in RS_Access_MAP

| Grammar | Length | Note |
|---|---|---|
| } | | |
| } | | |
| } | | |

TABLE 2

Positions of DL Allocation Reference IE and UL Allocation Reference IE contained in RS_RLY_MAP

| Grammar | Length | Note |
|---|---|---|
| RS_Relay-MAP_Message_Format{ ... | — | — |
| DL IE Count | 6 bits | The number of DL-MAP IEs |
| For(i=0;i<DL IE Count;i++){ | — | — |
| DL-MAP IE( ) | Variable | DL-MAP IE in R-MAP |
| DL Allocation Reference IE( ) | Variable | — |
| } | | |
| UL IE Count | 6 bits | The number of UL-MAP IEs |
| For(i=0; i<UL IE count;i++){ | — | — |
| UL-MAP IE( ) | Variable | The number of UL-MAP IEs in R-MAP |
| UL Allocation Reference IE( ) | Variable | — |
| } | | |
| R-link IE count | 6 bits | — |
| For(i=1; i<=R-link count;i+++){ | | |
| R-link specific IE( ) | | |
| } | | |
| padding | Variable | — |
| TLV Encoded Information | Variable | |
| } | | |

The message format of the DL Allocation Reference IE is shown in Table 3 and mainly contains the following fields:

Num_Received Frames, for indicating the number of data frames from which the MAC PDUs downwardly transmitted in the corresponding bandwidth allocated by the BS come;

Received Frame Index, for indicating a frame number of a data frame from which the MAC PDU downwardly transmitted in the corresponding bandwidth allocated by the BS comes, and expressed with the lower four bits of the frame number in this embodiment;

Num_MAP IEs, for indicating the number of bursts (one MAP IE corresponds to one burst) from which the MAC PDUs downwardly transmitted in the corresponding bandwidth allocated by the BS come;

MAP IE Index, for indicating an index number of a burst from which the MAC PDU downwardly transmitted in the corresponding bandwidth allocated by the BS comes;

All_Connections, for indicating whether MAC PDUs in all or some of connections need downlink transmission in the corresponding burst. When this field indicates that it is only necessary to forward the MAC PDUs of some of connections in the corresponding burst, as shown in Table 3, where the All_Connections is 0, then the RS is required to further check the following fields:

a CID, for indicating a connection identifier of the MAC PDU that is downwardly transmitted in the corresponding bandwidth allocated by the BS;

Num_MAC PDUs, for indicating the number of the MAC PDUs that belong to the CID and are about to be transmitted downwardly.

When the All_Connections indicates only some of MAC PDUs are needed to be forwarded, other MAC PDUs will still be saved on the RS.

When the BS sends the DL Allocation Reference IE to the RS, the above fields will be filled in according to need. For example, the number of frames may be indicated to be a few or one, or the number of bursts may be indicated to be a few or one, or the MAC PDUs in the burst may also be indicated.

By making use of the Received Frame Index in the DL Allocation Reference IE, the RS may map the data from different frames to a same bandwidth and then send them; by utilizing the fields of the R-MAP IE Index and the CID, the RS may divide a burst into a plurality of small bursts, or recombine the MAC PDUs from different bursts into one burst. By using this embodiment, if the condition of the down link of the RS is suddenly worsened, the BS may control the RS to cache some of the data through indicating the number of the sent PDUs, thus controlling the downlink data traffic of the RS and dynamically controlling the data transmission condition of the entire link.

TABLE 3

Message format of DL Allocation Reference IE in the embodiment of the present invention

| Grammar | Length | Note |
|---|---|---|
| DL Allocation Reference IE ( ) { | — | — |
| Extended-2 DIUC | 4 bits | DL Allocation Reference IE == 0xF |
| Length | 8 bits | — |
| Num_Received Frames | 4 bits | The number of RS received frames to which the allocated resource corresponds |
| For(i=0; i<Num_Received Frames; i++){ | | |
| Received Frame Index | 4 bits | The lower 4 bits of the frame number of the received frame to which the allocated resource corresponds |

TABLE 3-continued

Message format of DL Allocation Reference IE in the embodiment of the present invention

| Grammar | Length | Note |
|---|---|---|
| Num_MAP IEs | 4 bits | The number of MAP IEs in the frame to which the allocated resource corresponds |
| For(j=0; j<Num_MAP IEs; j++){ | — | — |
| MAP IE index | 10 bits | Index number of MAP IE |
| All_Connections | 1 bit | 0b1: the MAP IE corresponds to all of connections in the burst<br>0b0: the MAP IE corresponds to some of connections in the burst |
| If(All_Connections == 0){ | | |
| Num_CIDs | 4 bits | The number of connections |
| For(k=0; k<Num_CIDs; k++){ | | |
| CID | 16 bits | Connection identifier |
| Num_MAC PDUs | 9 bits | The number of MAC PDUs which are to be forwarded and correspond to the connection |
| } | | |
| } | | |
| } | | |
| } | | |
| } | | |

After the RS receives the DL Allocation Reference IE, the MAC PDUs in the indicated frame will be recombined, be put into the downlink burst indicated by the DL-MAP IE or the R-DL-MAP IE and be sent to the terminal or the lower RS. Wherein, the MAC PDU is received by the RS from the frame indicated by the DL Allocation Reference IE. In the above process, subject to actual condition, the recombination may be one of the following operations: the RS directly puts the MAC PDUs into the burst indicated by the IE without any other processing on them; or a burst is formed after the RS demodulates and decodes the MAC PDUs and then recodes and remodulates them; or a burst is formed after the RS segments and/or packs the MAC PDUs; or any other recombination. In case an abnormal condition occurs, for example, if the RS has received the DL Allocation Reference IE, but fails to find the MAC PDU corresponding to the DL Allocation Reference IE, this downlink allocation should be ignored and downlink data transmission will not be performed. Before the downlink transmission begins, the RS removes the DL Allocation Reference IE sent to it.

The message format of the UL Allocation Reference IE is shown in Table 4 and mainly contains the following fields:

Num_Received Frames, for indicating the number of data frames from which the MAC PDUs upwardly transmitted in the corresponding bandwidth allocated by the BS come;

Received Frame Index, for indicating a frame number of a data frame from which the MAC PDU upwardly transmitted in the corresponding bandwidth allocated by the BS comes, and expressed with the lower four bits of the frame number in this embodiment;

Num_MAP IEs, for indicating the number of bursts from which the MAC PDUs upwardly transmitted in the corresponding bandwidth allocated by the BS come;

MAP IE Index, for indicating an index number of a burst from which the MAC PDU upwardly transmitted in the corresponding bandwidth allocated by the BS comes; and All_Connections, for indicating whether MAC PDUs in all or some of connections need uplink transmission in the corresponding burst. When this field indicates that it is only necessary to forward the MAC PDUs in some of the connections in the corresponding burst, as shown in Table 4, where the All_Connections is 0, then the RS is required to further check the following fields:

a CID, for indicating a connection identifier of an MAC PDU that is upwardly transmitted in the corresponding bandwidth allocated by the BS; and Num_MAC PDUs, for indicating the number of the MAC PDUs that belong to the CID and are about to be transmitted upwardly.

When the All_Connections indicates that it is only necessary to forward some of the MAC PDUs, other MAC PDUs will still be saved on the RS.

When the BS sends the UL Allocation Reference IE to the RS, the above fields will be filled in according to need. For example, the number of frames may be indicated to be a few or one, or the number of bursts may be indicated to be a few or one, or the MAC PDUs in the burst may also be indicated.

By using the Received Frame Index in the UL Allocation Reference IE, the RS may map the data from different frames to a same bandwidth resource; by making use of the fields of the MAP IE Index and the CID, the RS may pack a plurality of small bursts into a large burst, thus lowering the overhead of the UL MAP IE, and the RS may also recombine some of the MAC PDUs in different bursts into a burst. By utilizing this embodiment, if the condition of the up link of the RS is suddenly worsened, the BS may control the uplink data traffic of the RS through instructing the RS to cache some of the data, thus dynamically controlling the data transmission condition of the entire link.

TABLE 4

Message format of UL Allocation Reference IE in the embodiment of the present invention

| Grammar | Length | Note |
|---|---|---|
| UL Allocation Reference IE( ){ | — | — |
| Extended-2 UIUC | 4 bits | UL Allocation Reference IE == 0xC |
| Length | 8 bits | — |
| Num_Received Frames | 4 bits | The number of RS received frames to which the allocated resource corresponds |
| For(i=0; i<Num_Received Frames; i++){ | | |
| Received Frame Index | 4 bits | The lower 4 bits of the frame number of the received frame to which the allocated resource corresponds |
| Num_MAP IEs | 4 bits | The number of MAP IEs in the frame to which the allocated resource corresponds |
| For(j=0; j<Num_MAP IEs; j++){ | — | — |
| MAP IE index | 10 bits | Index number of MAP IE |
| All_Connections | 1 bit | 0b1: the MAP IE corresponds to all of the connections in the burst<br>0b0: the MAP IE corresponds to some of the connections in the burst |
| If(All_Connections == 0){ | | |
| Num_CIDs | 4 | The number of connections |
| For(k=0; k<Num_CIDs; k++){ | | |
| CID | 16 bits | Connection identifier |
| Num_MAC PDUs | 9 bits | The number of MAC PDUs which are to be forwarded and correspond to the connection |
| } | | |
| } | | |
| } | | |
| } | | |
| } | | |

After the RS receives the UL Allocation Reference IE, the MAC PDUs in the indicated frame will be recombined, be put into the uplink burst indicated by the R-UL-MAP IE and be sent to the BS or the upper RS. The MAC PDUs are received by the RS from the frame and resource indicated by the UL Allocation Reference IE. In case an abnormal condition occurs, for example, if the RS has received the UL Allocation Reference IE, but fails to find the MAC PDU corresponding to the UL Allocation Reference IE, this uplink allocation should be ignored and uplink data transmission will not be performed. Before the uplink transmission begins, the RS removes UL Allocation Reference IE sent to it.

The type formats of the DL/UL Allocation Reference IE messages are message formats of a DL-MAP extended-2 IE and a UL-MAP extended-2 IE, respectively. Concretely, the two are an Extended-2 DIUC message and an Extended-2 UIUC message. See Table 5 and Table 6.

TABLE 5

Type format of DL Allocation Reference IE

| Extended-2 DIUC (hex) | Use |
|---|---|
| ... | ... |
| 0E | AAS_SDMA_DL_IE |
| 0F | DL Allocation Reference IE |

TABLE 6

Type format of UL Allocation Reference IE

| Extended-2 UIUC (hex) | Use |
|---|---|
| 0B | MIMO UL Extended IE |
| ... | ... |
| 0C | UL Allocation Reference IE |
| 0D | Reserved |

Figure 2:
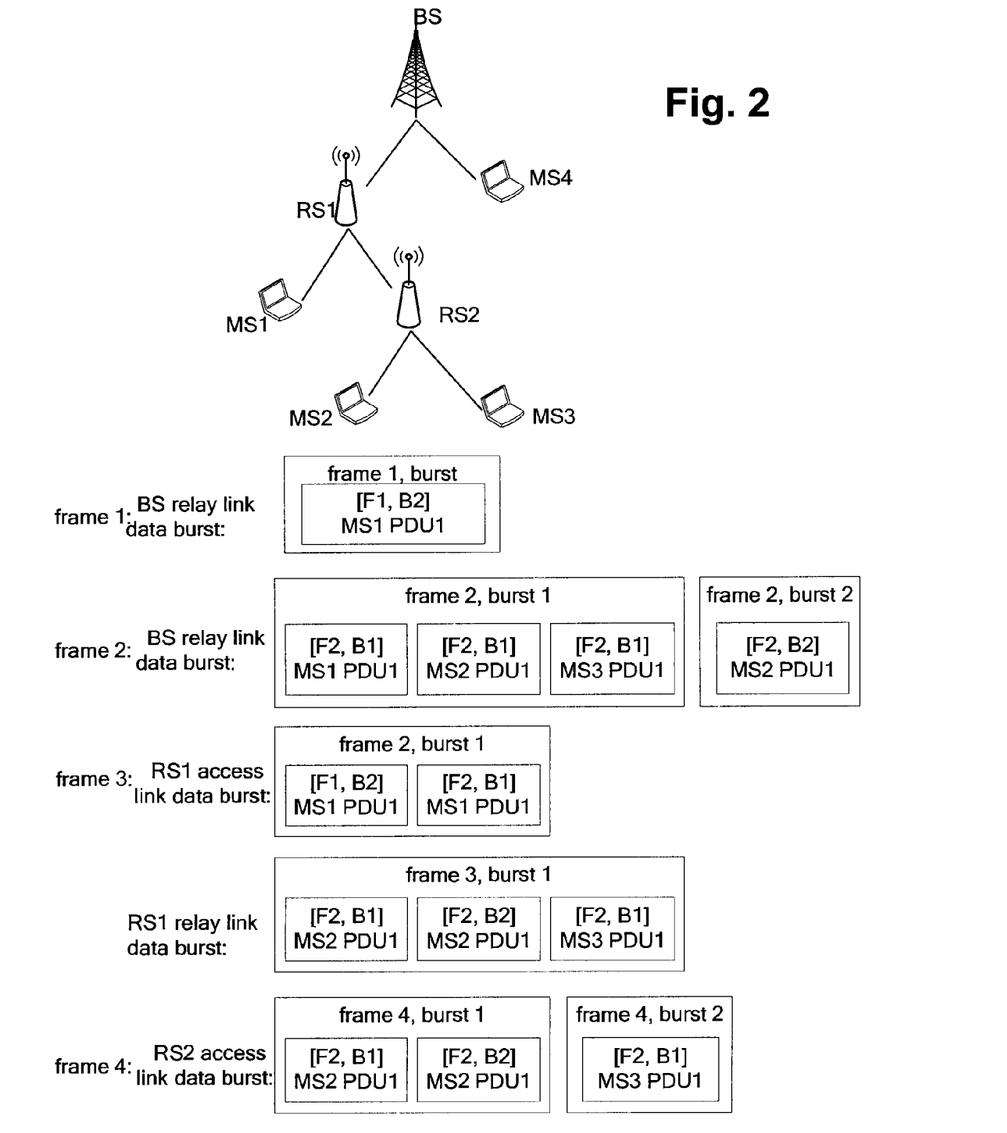
FIG. 2 illustrates a CID-based data transmission mode.

With regard to the CID-based downlink data transmission mode, as shown in FIG. 2, F stands for Frame, B stands for Burst, and a BS sends downlink data to an RS in Frame 1 and Frame 2; on an access link, RS1 packs MS1 MAC PDUs from different frames into a burst and then forwards them to MS1; on a relay link, RS1 packs MAC PDUs from different bursts into a burst and then forwards them to RS2; RS2 may also divide MAC PDUs from a same frame into a few small bursts and then forward them, and on the access link, RS2 may pack the MAC PDUs sent to MS2 and MS3 into two bursts and then forward them. The forwarding of more bursts is not shown in FIG. 2. For example, small bursts are packed into a large burst and then forwarded, or bursts are directly forwarded without packing or fragmentation.

Figure 3:
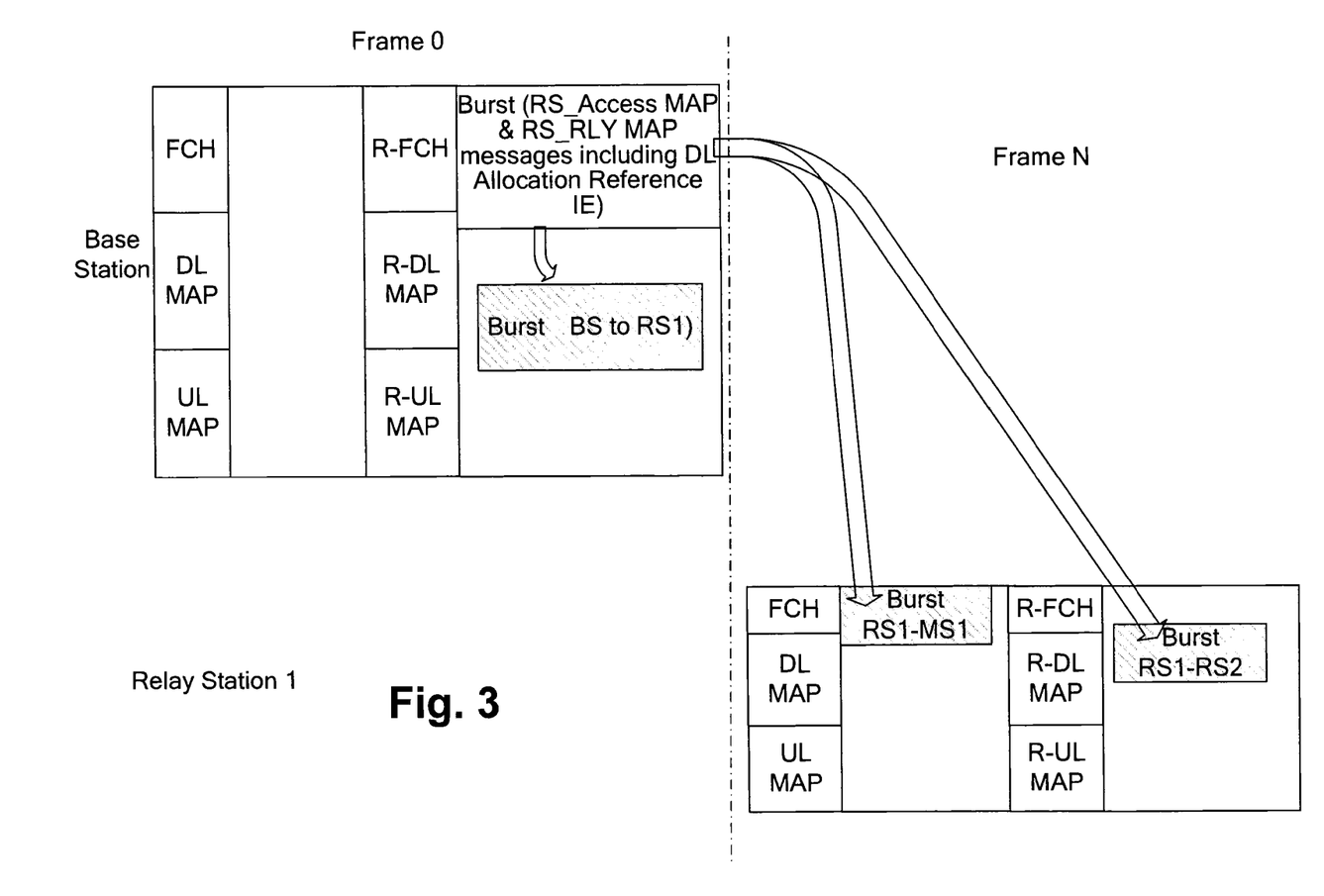
FIG. 3 is a schematic diagram of data and bandwidth association by using a DL Allocation Reference IE of the present invention.

In reference to the data transmission process shown in FIG. 3, a method for associating data with resources by using a DL Allocation Reference IE is described. In a relay zone, a BS sends a burst containing RS_Access MAP and RS_RLY_MAP messages. After a RS receives the burst, it will get, from the messages, DL MAP, UL MAP, R-DL MAP and R-UL MAP messages used in a down link as well as the corresponding DL Allocation Reference IE and UL Allocation Reference IE.

In Frame 0, the BS sends a burst of (BS to RS1) to RS1. After receiving the burst, RS1 will repack MAC PDUs thereof into four bursts: RS1-MS1 and RS1-RS2 according to the association indicated by the DL Allocation Reference IE, and forward them on the resources to which the access zone and relay zone of Frame N correspond. Wherein, the DL MAP IE/R-DL-MAP IE indicates the positions and size of bandwidths, while the DL Allocation Reference IE indicates the MAC PDUs sent in these bandwidths. The value of N is determined by the BS in light of the processing speed of the RS and other factors.

The example in which the RS uses the DL Allocation Reference IE to perform CID-based downlink data transmission is described below:

after the RS receives messages of the RS_Access_MAP and the RS_RLY_MAP, it will associate data with the corresponding DL MAP IE through the DL Allocation Reference IE in the messages;

if Num_Received Frames=1, Num_MAP IEs=1, and All_Connections=1 in the DL Allocation Reference IE, then the RS is only required to simply forward the entire burst indicated by the MAP IE index and does not need to read the CID of the MAC PDU in the burst;

if Num_Received Frames=1, Num_MAP IEs=1, and All_Connections=0 in the DL Allocation Reference IE, then the RS will pack some of the MAC PDUs in the burst indicated by the MAP IE index into a burst and then forward them. It is necessary to read the CID of the MAC PDU so as to know which MAC PDUs are required to be packed and forwarded;

if Num_Received Frames=1, and Num_MAP IEs>1 in the DL Allocation Reference IE, then the RS is required to pack the MAC PDUs from different bursts into a burst and then forward them;

if Num_Received Frames>1 in the DL Allocation Reference IE, then the RS is required to pack the MAC PDUs from different frames into one burst and then forward them together in a frame; and before the RS forwards downlink data, the DL Allocation Reference IE will be removed first.

The example in which the RS uses the UL Allocation Reference IE to perform CID-based uplink data transmission is described below:

after the RS receives the RS_RLY_MAP message, it will associate data with the corresponding UL MAP IE through the UL Allocation Reference IE in the message;

if Num_Received Frames=1, Num_MAP IEs=1, and All_Connections=1 in the UL Allocation Reference IE, then the RS is only required to simply forward the entire burst indicated by the MAP IE index and does not need to read the CID of the MAC PDU in the burst;

if Num_Received Frames=1, Num_MAP IEs=1, and All_Connections=0 in the UL Allocation Reference IE, then the RS will pack some of the MAC PDUs in the burst indicated by the MAP IE index into one burst and then forward them. It is necessary to read the CID of the MAC PDU so as to know which MAC PDUs are required to be packed and forwarded;

if Num_Received Frames=1, and Num_MAP IEs>1 in the UL Allocation Reference IE, then the RS is required to pack the MAC PDUs from different bursts into one burst and then forward them, thus saving the overhead occupied by the UL MAP IE;

if Num_Received Frames>1 in the UL Allocation Reference IE, the RS may pack the MAC PDUs from different frames into one burst and then forward them together in a frame; and before the RS forwards uplink data, the UL Allocation Reference IE will be removed first.

Embodiment 2

This embodiment is similar to the first embodiment. The difference is that this embodiment only adopts one MAP IE: a DL Allocation Reference IE. Same as the first embodiment, the DL Allocation Reference IE is used to indicate data downwardly sent by an RS. These data are sent to a terminal or a lower RS in a bandwidth indicated by a DL-MAP IE or an R-DL-MAP IE. Based on the indication of the DL Allocation Reference IE, when the RS downwardly sends the data, it may flexibly pack and send MAC PDUs in different frames or a same frame.

As described above, the DL Allocation Reference IE is used to associate the MAC PDU received by the RS with the downlink transmission bandwidth allocated to it. In the RS_Access MAP and RS_RLY MAP messages, the DL Allocation Reference IE is next to the corresponding DL-MAP IE or R-DL-MAP IE, and the positions of which in the RS_Access MAP and RS_RLY_MAP messages are shown in Table 7 and Table 8.

TABLE 7

| Position of DL Allocation Reference IE contained in RS_Access_MAP | | |
|---|---|---|
| Grammar | Length | Note |
| RS_Access-MAP_Message_Format { ... | — | — |
| If(bit #2 of indicator ==1){ | — | Information of RS DL-MAP or Compressed DL MAP |
| DCD Count | 8 bits | DCD Count in RS DL-MAP or Compressed DL MAP |
| Nr of OFDMA Symbols | 8 bits | The number of OFDMA Symbols in RS DL-MAP or Compressed DL MAP |
| DL IE Count | | The number of DL-MAP IEs |
| For(i=0; i<DL IE Count; i++){ | — | — |
| DL MAP IE( ) | Variable | The number of "DL MAP IEs" in RS DL-MAP or Compressed DL MAP |

TABLE 7-continued

Position of DL Allocation Reference IE contained in RS_Access_MAP

| Grammar | Length | Note |
|---|---|---|
| DL Allocation Reference IE( ) | Variable | Correspond to the DL MAP IE( ) and indicate the data allocated to the bandwidth |
| } | | |
| } | | |
| If(bit #4 of indicator ==1){ | — | Information of SUB-DL-UL-MAP |
| Nr of SUB-MAP | 2 bits | The number of SUB-DL-UL-MAPs |
| For(i=0;i<Nr of SUB-MAP;i++){ Reduced SUB-DL-UL-MAP( ){ ... | — | — |
| For(i=1;i<=DL IE Count;i++){ DL-MAP_IE( ) | Variable | — |
| DL Allocation Reference IE( ) | Variable | Correspond to the DL MAP IE( ) and indicate the data allocated to the bandwidth |
| } | | |
| } | | |
| } | | |
| } | | |
| ... | | |
| } | | |

TABLE 8

Position of DL Allocation Reference IE in RS_RLY_MAP

| Grammar | Length | Note |
|---|---|---|
| RS_Relay-MAP_Message_Format { ... | — | — |
| DL IE Count | 6 bits | The number of DL-MAP IEs |
| For(i=0;i<DL IE Count;i++){ | — | — |
| DL-MAP IE( ) | Variable | DL-MAP IE in R-MAP |
| DL Allocation Reference IE( ) } | Variable | — |
| ... | | |
| R-link IE count | 6 bits | — |
| For(i=1; i<=R-link count;i+++){ R-link specific IE( ) } | | |
| padding | Variable | — |
| TLV Encoded Information } | Variable | |

Besides, the message format of the DL Allocation Reference IE in this embodiment is shown in Table 9 and mainly contains the following fields:

Num_Connections, for indicating the number of connections from which the MAC PDUs transmitted in the corresponding bandwidth come;

a CID, for indicating a connection identifier of a connection from which the MAC PDU transmitted in the corresponding bandwidth comes.

Num_Received Frames, for indicating the number of data frames from which the MAC PDUs transmitted in the corresponding bandwidth and on the corresponding connections come;

Received Frame Index, for indicating a frame number of a data frame from which the MAC PDU transmitted in the corresponding bandwidth and on the corresponding connection comes; and Num_MAC PDUs, for indicating the number of the MAC PDUs which are transmitted in the corresponding bandwidth, are on the corresponding connections and come from the corresponding frames.

When a BS transmits the DL Allocation Reference IE to the RS, the above fields will be filled in according to need.

By using the fields of Num_Connections, CID, Num-Received Frames, Received Frame Index and Num_MAC PDUs in the DL Allocation Reference IE, the RS may map data from different connections to a same bandwidth and then send them.

TABLE 9

Message format of DL Allocation Reference IE in Embodiment 2

| Grammar | Length | Note |
|---|---|---|
| DL_Allocation_Reference_IE( ){ | — | — |
| Num_Connections | 4 bits | The number of connections contained in the corresponding allocation |
| for( i=0;i<Num_Connections;i++ ) { | | |
| CID | 16 bits | Connection identifier |
| Num_Received_Frame | 4 bits | |
| For(j=0;j<Num_Received Frame;j++){ | | |
| Received_Frame | 4 bits | The lower 4 bits of the index number of the frame from which the MAC PDU received by RS comes |

TABLE 9-continued

Message format of DL Allocation Reference IE in Embodiment 2

| Grammar | Length | Note |
|---|---|---|
| Num_MAC PDU | 4 bits | The number of the MAC PDUs that correspond to the connection and should be transmitted in the allocated bandwidth, unit: MAC PDU |
| } } Padding } | Variable | |

The foregoing descriptions are just the embodiments of the present invention, but are not to limit the present invention. For those skilled in the art, various modifications and changes may be made to the present invention. Any change, equivalent substitute or improvement without departing from the spirit and principle of the present invention shall be included within the protection scope of the appended claims of the present invention.

For example, in other embodiments, a DL Allocation Reference IE or a UL Allocation Reference IE may only contain Num_Connections and a CID. Or, when a BS sends the DL Allocation Reference IE or UL Allocation Reference IE to an RS, the Num_Connections and the CID will be contained and in addition frames to be transmitted are required to be indicated, too. In this case, the Num_MAC PDU to be sent may adopt default setting, for instance, all or some are designated.

Industrial Applicability

When the method described in the present invention is adopted, in a CID-based data transmission mode, an RS may associate the bandwidth allocated to it with corresponding data to be sent. The fields of Num_Received Frames and Received Frame Index in a DL Allocation Reference IE avoid the impact on the QoS performance resulting from the problem that the loss of an MAC PDU in a frame triggers the RS to send the MAC PDU in a subsequent frame in advance by making the delay between data reception and data forwarding of the RS variable and unfixed. If the condition of the down link of the RS is suddenly worsened, the BS may control downlink data traffic of the RS through instructing the RS to cache some of the data, thus dynamically controlling the data transmission condition of the entire link.

What is claimed is:

1. A data transmission method in a non-transparent centralized scheduling multi-hop relay network, comprising,
    adding, by a Base Station (BS), an allocation reference Information Element (IE) in a MAP message when the BS sends data, wherein the allocation reference IE indicates Media Access Control Protocol Data Units (MAC PDUs) to be sent;
    obtaining, by a lower Relay Station (RS), the MAC PDUs according to the allocation reference IE in the MAP message after the lower RS receives the MAP message sent by the BS or forwarded by other RS;
    recombining, by the lower RS, the obtained MAC PDUs, and sending the recombined MAC PDUs downwardly in a bandwidth resource allocated by the BS;
    wherein, the allocation reference IE comprises a downlink allocation reference IE; and
    the downlink allocation reference IE is before or behind a Downlink-MAP (DL-MAP) IE in an RS Access MAP message; after an RS receives the downlink allocation reference IE, MAC PDUs indicated by the downlink allocation reference IE will be recombined, and then be sent to a terminal in a downlink bandwidth resource indicated by the DL-MAP IE; or, the downlink allocation reference IE is before or behind an Relay-Downlink-MAP (R-DL-MAP) IE in an Relay Station Relay Link (RS RLY) MAP message; after the RS receives the downlink allocation reference IE, the MAC PDUs indicated by the downlink allocation reference IE will be recombined, and then be sent to the lower RS in a downlink bandwidth resource indicated by the R-DL-MAP IE;
    wherein, the downlink allocation reference IE contains Num Connections and a Connection ID (CID):
    the Num-Connections is for indicating the number of connections from which the MAC PDUs to be sent come; and
    the CID is for indicating a connection identifier of a connection from which the MAC PDUs to be sent comes;
    wherein, the downlink allocation reference IE further contains Num Received Frames and Received Frame Index:
    the Num Received Frames is for indicating the number of data frames from which the MAC PDUs transmitted in the corresponding bandwidth and on the corresponding connections come; and
    the Received Frame Index is for indicating a frame number of a data frame from which the MAC PDUs transmitted in the corresponding bandwidth and on the corresponding connection comes.

2. The method according to claim 1, wherein, when the allocation reference IE is in the RS_Access MAP message, the downlink allocation reference IE is before or behind the DL-MAP IE of all or some of the following messages: an RS_DL MAP message, a Compressed DL MAP message and an SUB-DL-UL MAP message.

3. The method according to claim 2, wherein, the method is applicable to a CID-based data transmission mode.

4. The method according to claim 1, wherein, the downlink allocation reference IE further contains Num_MAC PDUs, the Num_MAC PDUs is for indicating the number of the MAC PDUs which are transmitted in the corresponding bandwidth, are on the corresponding connections and come from the corresponding frames.

5. The method according to claim 1, wherein, the downlink allocation reference IE sent to the RS is removed before the RS starts downlink transmission.

6. The method according to claim 1, wherein, the method is applicable to a CID-based data transmission mode.

7. The method according to claim 1, wherein, after the RS receives the downlink allocation reference IE, if the MAC PDUs to which the downlink allocation reference IE corresponds fails to be found, no downlink data transmission is performed.

8. The method according to claim 1, wherein, the recombination refers to one of the following operations:
the RS puts the MAC PDUs into a burst indicated by the allocation reference IE;
a burst is formed after the RS demodulates and decodes the MAC PDUs and then recodes and remodulates them; and
a burst is formed after the RS segments and/or packs the MAC PDUs.

9. A method for associating a MAP message with corresponding data in a multi-hop relay network, comprising:
adding an allocation reference IE in the MAP message, wherein the allocation reference IE indicates MAC PDUs to be sent;
obtaining, by an RS, the MAC PDUs according to the allocation reference IE in the MAP message after the RS receives the MAP message sent by a BS or forwarded by other RS;
recombining, by the RS, the obtained MAC PDUs, and sending the recombined MAC PDUs in a bandwidth resource allocated by the BS;
wherein, the allocation reference IE comprises a downlink allocation reference IE; and
the downlink allocation reference IE is before or behind a DL-MAP IE in an RS Access MAP message; after the RS receives the downlink allocation reference IE, the MAC PDUs indicated by the RS will be recombined, and then be sent to a terminal in a downlink bandwidth resource indicated by the DL-MAP IE; or, the downlink allocation reference IE is before or behind an R-DL-MAP IE in an RS RLY MAP message; after the RS receives the downlink allocation reference IE, the MAC PDUs indicated by the RS is recombined, and then is sent to a lower RS in a downlink bandwidth resource indicated by the R-DL-MAP IE;
wherein, the allocation reference IE contains Num Connections and a CID:
the Num-Connections is for indicating the number of connections from which the MAC PDUs to be sent come;
the CID is for indicating a connection identifier of a connection from which the MAC PDUs to be sent comes;
wherein, the allocation reference IE further contains Num Received Frames and Received Frame Index:
the Num Received Frames is for indicating the number of data frames from which the MAC PDUs transmitted in the corresponding bandwidth and on the corresponding connections come; and
the Received Frame Index is for indicating a frame number of a data frame from which the MAC PDUs transmitted in the corresponding bandwidth and on the corresponding connection comes.

10. The method according to claim 9, wherein,
when the allocation reference IE is in the RS_Access MAP message, the downlink allocation reference IE is before or behind the DL-MAP IE in all or some of the following messages: an RS_DL MAP message, a Compressed DL MAP message, an SUB-DL-UL MAP message and an HARQ MAP message.

11. The method according to claim 10, wherein,
the method is applicable to a non-transparent centralized scheduling multi-hop relay network in a CID-based data transmission mode.

12. The method according to claim 10, wherein, the recombination refers to one of the following operations:
the RS puts the MAC PDUs into a burst indicated by the allocation reference IE;
a burst is formed after the RS demodulates and decodes the MAC PDUs and then recodes and remodulates them; and
a burst is formed after the RS segments and/or packs the MAC PDUs.

13. The method according to claim 9, wherein,
the allocation reference IE further comprises an uplink allocation reference IE; the uplink allocation reference IE is in the RS_RLY MAP message and is before or after an R-UL-MAP IE; and
after the RS receives the uplink allocation reference IE, the MAC PDUs indicated by the RS is recombined, and then is sent to the BS or an upper RS in an uplink bandwidth resource indicated by the R-UL-MAP IE.

14. The method according to claim 13, wherein,
the method is applicable to a non-transparent centralized scheduling multi-hop relay network in a CID-based data transmission mode.

15. The method according to claim 13, wherein, the recombination refers to one of the following operations:
the RS puts the MAC PDUs into a burst indicated by the allocation reference IE;
a burst is formed after the RS demodulates and decodes the MAC PDUs and then recodes and remodulates them; and
a burst is formed after the RS segments and/or packs the MAC PDUs.

16. The method according to claim 9, wherein, the allocation reference IE also contains Num_MAC PDUs, the Num_MAC PDUs is for indicating the number of MAC PDUs which are transmitted in the corresponding bandwidth, are on the corresponding connections and come from the corresponding frames.

17. The method according to claim 9, wherein,
the downlink allocation reference IE sent to the RS is removed before the RS starts downlink transmission.

18. The method according to claim 9, wherein,
the method is applicable to a non-transparent centralized scheduling multi-hop relay network in a CID-based data transmission mode.

19. The method according to claim 9, wherein, the recombination refers to one of the following operations:
the RS puts the MAC PDUs into a burst indicated by the allocation reference IE;
a burst is formed after the RS demodulates and decodes the MAC PDUs and then recodes and remodulates them; and
a burst is formed after the RS segments and/or packs the MAC PDUs.

* * * * *